(12) United States Patent
Zhang et al.

(10) Patent No.: US 8,675,981 B2
(45) Date of Patent: Mar. 18, 2014

(54) MULTI-MODAL GENDER RECOGNITION INCLUDING DEPTH DATA

(75) Inventors: Zhengyou Zhang, Bellevue, WA (US); Alex Aben-Athar Kipman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 950 days.

(21) Appl. No.: 12/813,675

(22) Filed: Jun. 11, 2010

(65) Prior Publication Data

US 2011/0307260 A1 Dec. 15, 2011

(51) Int. Cl.
G06K 9/40 (2006.01)
G06K 9/62 (2006.01)

(52) U.S. Cl.
USPC .......................................... 382/260; 382/159

(58) Field of Classification Search
None
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Lu, Xiaoguang, Hong Chen, and Anil K. Jain. "Multimodal facial gender and ethnicity identification." Advances in Biometrics. Springer Berlin Heidelberg, 2005. 554-561.*

(Continued)

*Primary Examiner* — Nirav G Patel
(74) *Attorney, Agent, or Firm* — Judy Yee; Peter Taylor; Micky Minhas

(57) ABSTRACT

Gender recognition is performed using two or more modalities. For example, depth image data and one or more types of data other than depth image data is received. The data pertains to a person. The different types of data are fused together to automatically determine gender of the person. A computing system can subsequently interact with the person based on the determination of gender.

20 Claims, 14 Drawing Sheets

(56) References Cited

U.S. PATENT DOCUMENTS

| | | | |
|---|---|---|---|
| 5,385,519 | A | 1/1995 | Hsu et al. |
| 5,405,152 | A | 4/1995 | Katanics et al. |
| 5,417,210 | A | 5/1995 | Funda et al. |
| 5,423,554 | A | 6/1995 | Davis |
| 5,454,043 | A | 9/1995 | Freeman |
| 5,469,740 | A | 11/1995 | French et al. |
| 5,495,576 | A | 2/1996 | Ritchey |
| 5,516,105 | A | 5/1996 | Eisenbrey et al. |
| 5,524,637 | A | 6/1996 | Erickson et al. |
| 5,534,917 | A | 7/1996 | MacDougall |
| 5,563,988 | A | 10/1996 | Maes et al. |
| 5,577,981 | A | 11/1996 | Jarvik |
| 5,580,249 | A | 12/1996 | Jacobsen et al. |
| 5,594,469 | A | 1/1997 | Freeman et al. |
| 5,597,309 | A | 1/1997 | Riess |
| 5,616,078 | A | 4/1997 | Oh |
| 5,617,312 | A | 4/1997 | Iura et al. |
| 5,638,300 | A | 6/1997 | Johnson |
| 5,641,288 | A | 6/1997 | Zaenglein |
| 5,682,196 | A | 10/1997 | Freeman |
| 5,682,229 | A | 10/1997 | Wangler |
| 5,690,582 | A | 11/1997 | Ulrich et al. |
| 5,703,367 | A | 12/1997 | Hashimoto et al. |
| 5,704,837 | A | 1/1998 | Iwasaki et al. |
| 5,715,834 | A | 2/1998 | Bergamasco et al. |
| 5,875,108 | A | 2/1999 | Hoffberg et al. |
| 5,877,803 | A | 3/1999 | Wee et al. |
| 5,913,727 | A | 6/1999 | Ahdoot |
| 5,933,125 | A | 8/1999 | Fernie |
| 5,980,256 | A | 11/1999 | Carmein |
| 5,989,157 | A | 11/1999 | Walton |
| 5,995,649 | A | 11/1999 | Marugame |
| 6,005,548 | A | 12/1999 | Latypov et al. |
| 6,009,210 | A | 12/1999 | Kang |
| 6,054,991 | A | 4/2000 | Crane et al. |
| 6,066,075 | A | 5/2000 | Poulton |
| 6,072,494 | A | 6/2000 | Nguyen |
| 6,073,489 | A | 6/2000 | French et al. |
| 6,077,201 | A | 6/2000 | Cheng |
| 6,098,458 | A | 8/2000 | French et al. |
| 6,100,896 | A | 8/2000 | Strohecker et al. |
| 6,101,289 | A | 8/2000 | Kellner |
| 6,128,003 | A | 10/2000 | Smith et al. |
| 6,130,677 | A | 10/2000 | Kunz |
| 6,141,463 | A | 10/2000 | Covell et al. |
| 6,147,678 | A | 11/2000 | Kumar et al. |
| 6,152,856 | A | 11/2000 | Studor et al. |
| 6,159,100 | A | 12/2000 | Smith |
| 6,173,066 | B1 | 1/2001 | Peurach et al. |
| 6,181,343 | B1 | 1/2001 | Lyons |
| 6,188,777 | B1 | 2/2001 | Darrell et al. |
| 6,215,890 | B1 | 4/2001 | Matsuo et al. |
| 6,215,898 | B1 | 4/2001 | Woodfill et al. |
| 6,226,396 | B1 | 5/2001 | Marugame |
| 6,229,913 | B1 | 5/2001 | Nayar et al. |
| 6,256,033 | B1 | 7/2001 | Nguyen |
| 6,256,400 | B1 | 7/2001 | Takata et al. |
| 6,283,860 | B1 | 9/2001 | Lyons et al. |
| 6,289,112 | B1 | 9/2001 | Jain et al. |
| 6,299,308 | B1 | 10/2001 | Voronka et al. |
| 6,308,565 | B1 | 10/2001 | French et al. |
| 6,316,934 | B1 | 11/2001 | Amorai-Moriya et al. |
| 6,363,160 | B1 | 3/2002 | Bradski et al. |
| 6,384,819 | B1 | 5/2002 | Hunter |
| 6,411,744 | B1 | 6/2002 | Edwards |
| 6,430,997 | B1 | 8/2002 | French et al. |
| 6,476,834 | B1 | 11/2002 | Doval et al. |
| 6,496,598 | B1 | 12/2002 | Harman |
| 6,503,195 | B1 | 1/2003 | Keller et al. |
| 6,512,838 | B1 | 1/2003 | Rafii et al. |
| 6,539,931 | B2 | 4/2003 | Trajkovic et al. |
| 6,570,555 | B1 | 5/2003 | Prevost et al. |
| 6,633,294 | B1 | 10/2003 | Rosenthal et al. |
| 6,640,202 | B1 | 10/2003 | Dietz et al. |
| 6,661,918 | B1 | 12/2003 | Gordon et al. |
| 6,674,877 | B1 | 1/2004 | Jojic et al. |
| 6,681,031 | B2 | 1/2004 | Cohen et al. |
| 6,714,665 | B1 | 3/2004 | Hanna et al. |
| 6,731,799 | B1 | 5/2004 | Sun et al. |
| 6,738,066 | B1 | 5/2004 | Nguyen |
| 6,765,726 | B2 | 7/2004 | French et al. |
| 6,788,809 | B1 | 9/2004 | Grzeszczuk et al. |
| 6,801,637 | B2 | 10/2004 | Voronka et al. |
| 6,873,723 | B1 | 3/2005 | Aucsmith et al. |
| 6,876,496 | B2 | 4/2005 | French et al. |
| 6,937,742 | B2 | 8/2005 | Roberts et al. |
| 6,950,534 | B2 | 9/2005 | Cohen et al. |
| 7,003,134 | B1 | 2/2006 | Covell et al. |
| 7,036,094 | B1 | 4/2006 | Cohen et al. |
| 7,038,855 | B2 | 5/2006 | French et al. |
| 7,039,676 | B1 | 5/2006 | Day et al. |
| 7,042,440 | B2 | 5/2006 | Pryor et al. |
| 7,050,606 | B2 | 5/2006 | Paul et al. |
| 7,058,204 | B2 | 6/2006 | Hildreth et al. |
| 7,060,957 | B2 | 6/2006 | Lange et al. |
| 7,113,918 | B1 | 9/2006 | Ahmad et al. |
| 7,121,946 | B2 | 10/2006 | Paul et al. |
| 7,170,492 | B2 | 1/2007 | Bell |
| 7,184,048 | B2 | 2/2007 | Hunter |
| 7,202,898 | B1 | 4/2007 | Braun et al. |
| 7,222,078 | B2 | 5/2007 | Abelow |
| 7,227,526 | B2 | 6/2007 | Hildreth et al. |
| 7,259,747 | B2 | 8/2007 | Bell |
| 7,308,112 | B2 | 12/2007 | Fujimura et al. |
| 7,317,836 | B2 | 1/2008 | Fujimura et al. |
| 7,348,963 | B2 | 3/2008 | Bell |
| 7,359,121 | B2 | 4/2008 | French et al. |
| 7,367,887 | B2 | 5/2008 | Watabe et al. |
| 7,379,563 | B2 | 5/2008 | Shamaie |
| 7,379,566 | B2 | 5/2008 | Hildreth |
| 7,389,591 | B2 | 6/2008 | Jaiswal et al. |
| 7,412,077 | B2 | 8/2008 | Li et al. |
| 7,421,093 | B2 | 9/2008 | Hildreth et al. |
| 7,430,312 | B2 | 9/2008 | Gu |
| 7,436,496 | B2 | 10/2008 | Kawahito |
| 7,450,736 | B2 | 11/2008 | Yang et al. |
| 7,452,275 | B2 | 11/2008 | Kuraishi |
| 7,460,690 | B2 | 12/2008 | Cohen et al. |
| 7,489,812 | B2 | 2/2009 | Fox et al. |
| 7,536,032 | B2 | 5/2009 | Bell |
| 7,555,142 | B2 | 6/2009 | Hildreth et al. |
| 7,560,701 | B2 | 7/2009 | Oggier et al. |
| 7,570,805 | B2 | 8/2009 | Gu |
| 7,574,020 | B2 | 8/2009 | Shamaie |
| 7,576,727 | B2 | 8/2009 | Bell |
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,668,790 | B2 | 2/2010 | Barbu et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2003/0110038 | A1 | 6/2003 | Sharma et al. |
| 2004/0062520 | A1 | 4/2004 | Gutta et al. |
| 2008/0026838 | A1 | 1/2008 | Dunstan et al. |

(56) References Cited

U.S. PATENT DOCUMENTS

| | | | |
|---|---|---|---|
| 2008/0059147 A1 | 3/2008 | Afify et al. | |
| 2008/0152191 A1 | 6/2008 | Fujimura et al. | |
| 2009/0141933 A1 | 6/2009 | Wagg | |
| 2009/0221368 A1 | 9/2009 | Yen et al. | |
| 2009/0222526 A1* | 9/2009 | Cox et al. | 709/206 |
| 2009/0231425 A1 | 9/2009 | Zalewski | |
| 2010/0106573 A1* | 4/2010 | Gallagher et al. | 705/14.4 |
| 2011/0224979 A1* | 9/2011 | Raux | 704/233 |
| 2013/0011062 A1* | 1/2013 | Conwell et al. | 382/173 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | WO2009059065 | 5/2009 |

OTHER PUBLICATIONS

Hu, Yuan, Jingqi Yan, and Pengfei Shi. "A fusion-based method for 3D facial gender classification." Computer and Automation Engineering (ICCAE), 2010 The 2nd International Conference on. vol. 5. IEEE, 2010.*

Qian, et al., "A Gesture-Driven Multimodal Interactive Dance System," 2004 IEEE International Conference on Multimedia and Expo (ICME), 2004, pp. 1579-1582.

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Kanade et al., "A Stereo Machine for Video-rate Dense Depth Mapping and its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", in Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interact Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Mahoor, "A Multi-Modal Approach for Face Modeling and Recognition", Dissertation at the University of Miami, Dec. 2007, 169 pages, http://etd.library.miami.edu/theses/available/etd-01112008-165200/unrestricted/mmahoorF07.pdf.

Hadid, "Combining Motion and Appearance for Gender Classification from Video Sequences", Proceedings of the 19th IEEE Conference on Pattern Recognition, Dec. 8-11 2008, pp. 1-4.

Matta, "Facial Gender Recognition Using Multiple Sources of Visual Information", IEEE International Workshop on Multimedia Signal Processing, Oct. 8-10, 2008, http://www.laboratoire-usages.com/util/publidownload.fr.htm? id=2631.

Shan, "Fusing Gait and Face Cues for Human Gender Recognition", Neurocomputing, Mar. 2008, pp. 1931-1938, vol. 71, Elsevier B.V.

Ueki, "Gender and Age-Group Classification Based on the Integration of Multiple Classifiers with Various Image Features", IEICE Transaction on Information and Systems, Jul. 2007, pp. 1-117, Department of Computer Science, Waseda University, Tokyo, JP.

Xu, "Automatic 3D Face Recognition Combining Global Geometric Features with Local Shape Variation Information," Proceedings of the Sixth IEEE International Conference on Automatic Face and Gesture Recognition, 2004.

Chinese Office Action dated Jul. 25, 2013, Chinese Patent Application No. 201110170752.9.

* cited by examiner

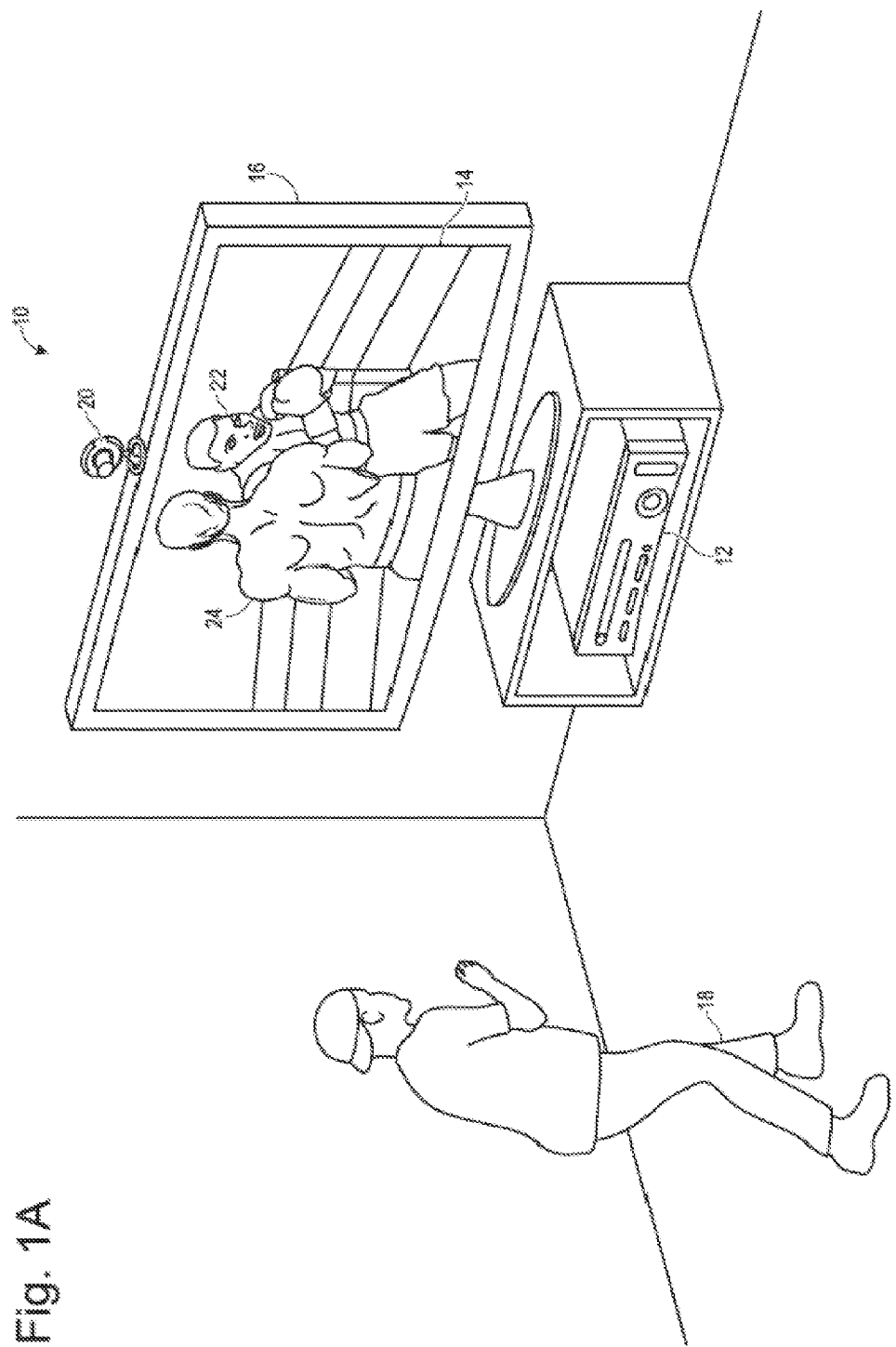

$y_i = g(\Sigma(w_{ij}x_j) + bias)$ $Z_m = h(\Sigma(w_{mi}y_i) + bias)$

MULTI-MODAL GENDER RECOGNITION INCLUDING DEPTH DATA

BACKGROUND

Computers are becoming more useful in everyday lives, from surfing the Internet to entertainment and productivity tools. In many computer applications, the interaction between the user and the computer can be optimized based on gender. That is, the computer can provide a different experience for males than for females.

In some cases, the different experience based on gender is to customize an entertainment experience. For example, when playing some video games, the game may include the user controlling an avatar. It may be desired for a female player to control a female avatar and a male player to control a male avatar.

In other cases, the different experience based on gender is for performance reasons. For example, some computing devices can be voice controlled. Recognizing voice commands can be difficult for many reasons. One reason is that men and women have different voices. Knowing whether a user is male or female may help a voice command recognition system recognize voice commands by using an appropriate acoustical model.

SUMMARY

Technology is proposed for automatically recognizing gender based on two or more modalities, one of which is a source of depth image data. The contribution from each modality is different and dynamic depending on the reliability of the modality in the particular environment. The different data from the different modalities is fused together using one or more methods described herein to arrive at a determination of gender.

One embodiment includes receiving depth data about a person, receiving one or more types of data other than depth data about the person, automatically determining gender of the person based on the depth data and the one or more types of data other than depth data, and performing an action (e.g., interacting with the person) based on the determination of gender.

One embodiment includes one or more processor readable storage devices having processor readable code stored thereon. The processor readable code programs the one or more processors. The processor readable code comprises code that extracts depth features, code that extracts one or more other features, code that classifies gender based on at least one depth feature, code that classifies gender based on at least one feature other than depth, and code which makes a conclusion as to gender based on output from the code that classifies gender based on at least one depth feature and the code that classifies gender based on at least one feature other than depth.

One embodiment includes a depth sensor, a sensor that is different than a depth sensor, a user interface (e.g., keyboard, mouse, monitor, touch screen, microphone, speaker, etc.), and a processor in communication with the depth sensor, different sensor and the user interface. The processor determines gender of a person based on data from the depth sensor and the different sensor. The processor changes the user interface based on the determination of gender.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1A and 1B illustrate an example embodiment of a tracking system with a user playing a game.

DETAILED DESCRIPTION

Technology is provided for automatically determining gender based on two or more types of data. Gender recognition is very useful for many applications including human-computer interaction such as using appropriate avatars to interact with the user or selecting an appropriate acoustical model to recognize the user's voice. Gender information can be observed from a number of sources such as voice, face, body shape and gait (way of walking). Gender recognition from a single source can be error-prone. And even for the same data source, different modalities of sensing can reveal different gender features. For example, nose structure is an example feature to distinguish males from females, and can be easily observed by a depth camera, but difficult by a video camera from the front. Thus, the systems described below integrate available information from multiple modalities to produce an accurate recognition of a user's gender.

Examples are provided below that use the gender recognition technology with a video game system. The use of a video game system is just one possible implementation and is used as an example to teach the technology. However, the technology described herein also applies to other types of data processing systems and/or other types of applications.

Figure 1B:
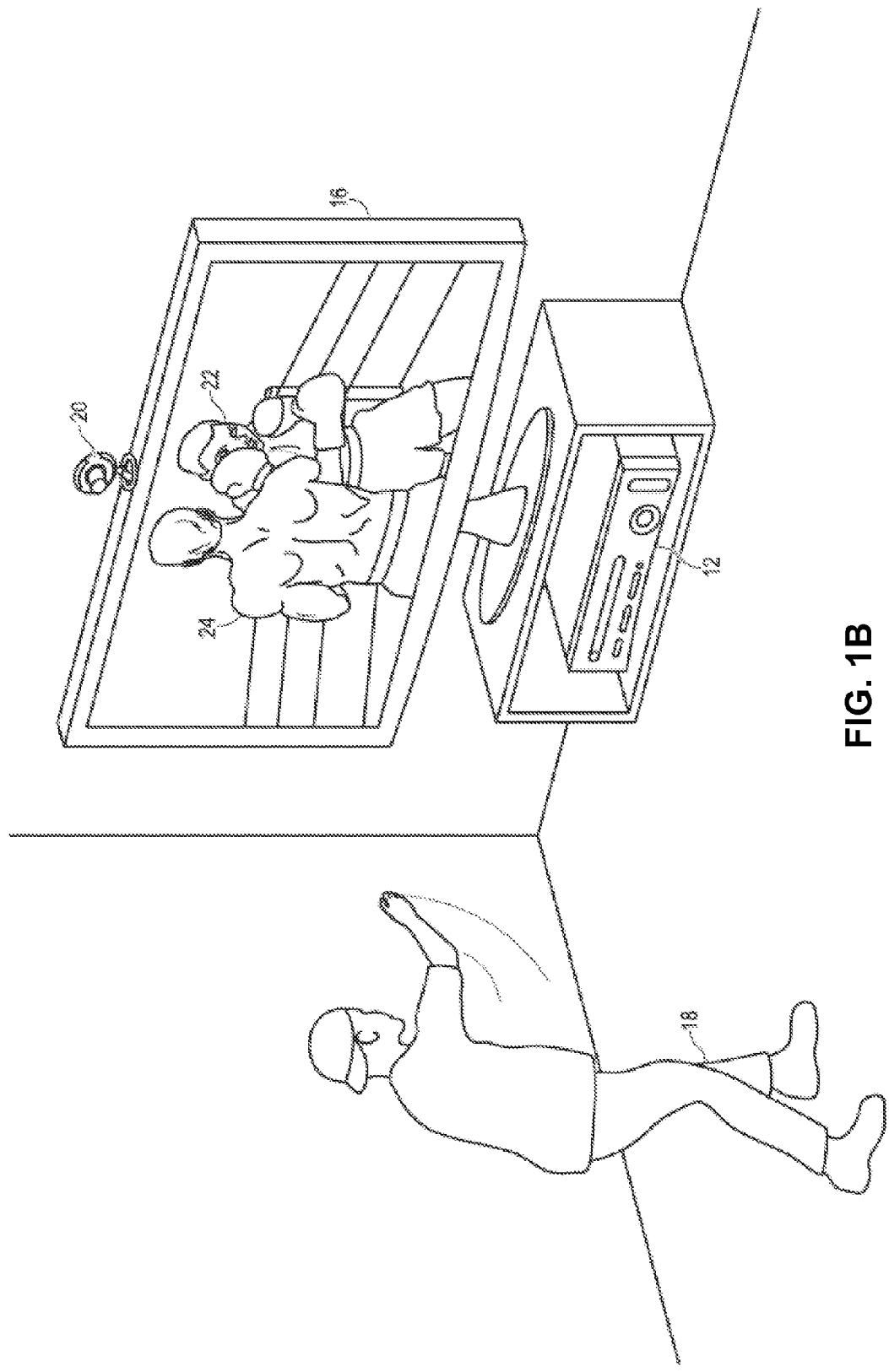

FIGS. 1A and 1B illustrate an example embodiment of a system 10 with a user 18 playing a boxing game. In an example embodiment, the system 10 may be used to recognize, analyze, and/or track a human target such as the user 18 or other objects within range of tracking system 10 and interact with the user. By knowing the gender of the user, the interaction can be customized for the user.

As shown in FIG. 1A, tracking system 10 may include a computing system 12. The computing system 12 may be a computer, a gaming system or console, or the like. According to an example embodiment, the computing system 12 may include hardware components and/or software components such that computing system 12 may be used to execute applications such as gaming applications, non-gaming applications, or the like. In one embodiment, computing system 12 may include a processor such as a standardized processor, a specialized processor, a microprocessor, or the like that may execute instructions stored on a processor readable storage device for performing the processes described herein.

As shown in FIG. 1A, tracking system 10 may further include a capture device 20. The capture device 20 may be, for example, a camera that may be used to visually monitor one or more users, such as the user 18, such that gestures and/or movements performed by the one or more users may be captured, analyzed, and tracked to perform one or more controls or actions within the application and/or animate an avatar or on-screen character, as will be described in more detail below.

According to one embodiment, the tracking system 10 may be connected to an audiovisual device 16 such as a television, a monitor, a high-definition television (HDTV), or the like that may provide game or application visuals and/or audio to a user such as the user 18. For example, the computing system 12 may include a video adapter such as a graphics card and/or an audio adapter such as a sound card that may provide audiovisual signals associated with the game application, non-game application, or the like. The audiovisual device 16 may receive the audiovisual signals from the computing system 12 and may then output the game or application visuals and/or audio associated with the audiovisual signals to the user 18. According to one embodiment, the audiovisual device 16 may be connected to the computing system 12 via, for example, an S-Video cable, a coaxial cable, an HDMI cable, a DVI cable, a VGA cable, component video cable, or the like.

As shown in FIGS. 1A and 1B, the tracking system 10 may be used to recognize, analyze, and/or track a human target such as the user 18. For example, the user 18 may be tracked using the capture device 20 such that the gestures and/or movements of user 18 may be captured to animate an avatar or on-screen character and/or may be interpreted as controls that may be used to affect the application being executed by computer environment 12. Thus, according to one embodiment, the user 18 may move his or her body to control the application and/or animate the avatar or on-screen character.

In the example depicted in FIGS. 1A and 1B, the application executing on the computing system 12 may be a boxing game that the user 18 is playing. For example, the computing system 12 may use the audiovisual device 16 to provide a visual representation of a boxing opponent 22 to the user 18. The computing system 12 may also use the audiovisual device 16 to provide a visual representation of a user avatar 24 that the user 18 may control with his or her movements. For example, as shown in FIG. 1B, the user 18 may throw a punch in physical space to cause the user avatar 24 to throw a punch in game space. Thus, according to an example embodiment, the computer system 12 and the capture device 20 recognize and analyze the punch of the user 18 in physical space such that the punch may be interpreted as a game control of the user avatar 24 in game space and/or the motion of the punch may be used to animate the user avatar 24 in game space.

Other movements by the user 18 may also be interpreted as other controls or actions and/or used to animate the user avatar, such as controls to bob, weave, shuffle, block, jab, or throw a variety of different power punches. Furthermore, some movements may be interpreted as controls that may correspond to actions other than controlling the user avatar 24. For example, in one embodiment, the user may use movements to end, pause, or save a game, select a level, view high scores, communicate with a friend, etc. According to another embodiment, the user may use movements to select the game or other application from a main user interface. Thus, in example embodiments, a full range of motion of the user 18 may be available, used, and analyzed in any suitable manner to interact with an application.

In example embodiments, the human target such as the user 18 may have an object. In such embodiments, the user of an electronic game may be holding the object such that the motions of the user and the object may be used to adjust and/or control parameters of the game. For example, the motion of a user holding a racket may be tracked and utilized for controlling an on-screen racket in an electronic sports game. In another example embodiment, the motion of a user holding an object may be tracked and utilized for controlling an on-screen weapon in an electronic combat game. Objects not held by the user can also be tracked, such as objects thrown, pushed or rolled by the user (or a different user) as well as self propelled objects. In addition to boxing, other games can also be implemented.

According to other example embodiments, the tracking system 10 may further be used to interpret target movements as operating system and/or application controls that are outside the realm of games. For example, virtually any controllable aspect of an operating system and/or application may be controlled by movements of the target such as the user 18.

Figure 2:
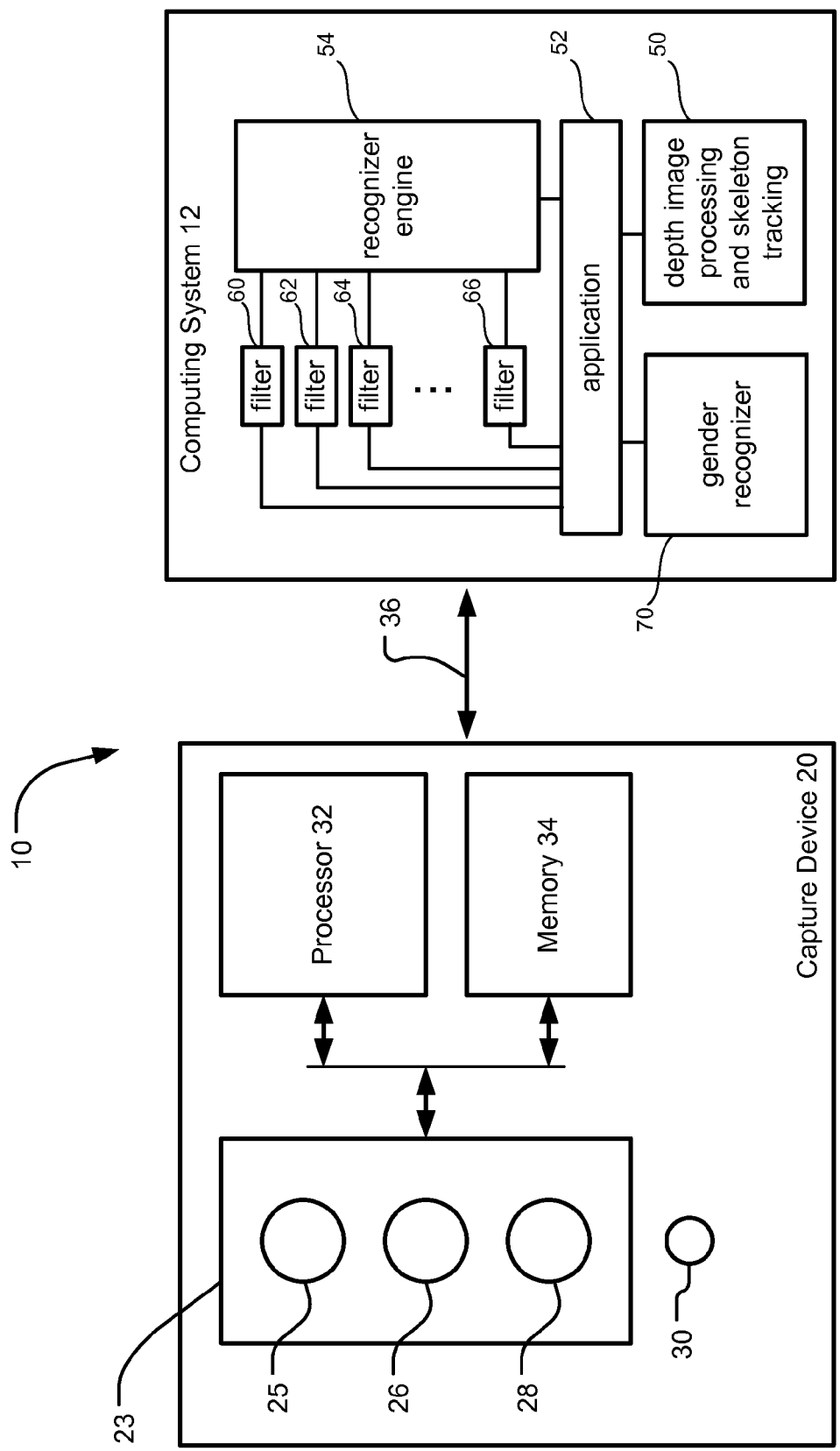
FIG. 2 illustrates an example embodiment of a capture device that may be used as part of the tracking system.

FIG. 2 illustrates an example embodiment of the capture device 20 that may be used in the tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 2, the capture device 20 may include a camera component 23. According to an example embodiment, the camera component 23 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2, according to an example embodiment, the image camera component 23 may include an infra-red (IR) light component 25, a three-dimensional (3-D) camera 26, and an RGB (visual image) camera 28 that may be used to capture the depth image of a scene. For example, in time-of-flight analysis, the IR light component 25 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern, a stripe pattern, or different pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 (and/or other sensor) and may then be analyzed to determine a physical distance from the capture device to a particular location on the targets or objects. In some implementations, the IR Light component 25 is displaced from the cameras 25 and 26 so triangulation can be used to determined distance from cameras 25 and 26. In some implementations, the capture device 20 will include a dedicated IR sensor to sense the IR light, or a sensor with an IR filter.

According to another embodiment, the capture device 20 may include two or more physically separated cameras that may view a scene from different angles to obtain visual stereo data that may be resolved to generate depth information. Other types of depth image sensors can also be used to create a depth image.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing system 12 in the target recognition, analysis, and tracking system 10. Additionally, the microphone 30 may be used to receive audio signals that may also be provided by to computing system 12.

In an example embodiment, the capture device 20 may further include a processor 32 that may be in communication with the image camera component 22. The processor 32 may include a standardized processor, a specialized processor, a microprocessor, or the like that may execute instructions including, for example, instructions for receiving a depth image, generating the appropriate data format (e.g., frame) and transmitting the data to computing system 12.

The capture device 20 may further include a memory component 34 that may store the instructions that are executed by processor 32, images or frames of images captured by the 3-D camera and/or RGB camera, or any other suitable information, images, or the like. According to an example embodiment, the memory component 34 may include random access memory (RAM), read only memory (ROM), cache, flash memory, a hard disk, or any other suitable storage component. As shown in FIG. 2, in one embodiment, memory component 34 may be a separate component in communication with the image capture component 22 and the processor 32. According to another embodiment, the memory component 34 may be integrated into processor 32 and/or the image capture component 22.

As shown in FIG. 2, capture device 20 may be in communication with the computing system 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing system 12 may provide a clock to the capture device 20 that may be used to determine when to capture, for example, a scene via the communication link 36. Additionally, the capture device 20 provides the depth information and visual (e.g., RGB) images captured by, for example, the 3-D camera 26 and/or the RGB camera 28 to the computing system 12 via the communication link 36. In one embodiment, the depth images and visual images are transmitted at 30 frames per second. The computing system 12 may then use the model, depth information, and captured images to, for example, control an application such as a game or word processor and/or animate an avatar or on-screen character.

Computing system 12 includes depth image processing and skeletal tracking module 50, which uses the depth images to track one or more persons detectable by the depth camera. Depth image processing and skeletal tracking module 50 provides the tracking information to application 52, which can be a video game, productivity application, communications application or other software application etc. The audio data and visual image data is also provided to application 52 and depth image processing and skeletal tracking module 50. Application 52 provides the tracking information, audio data and visual image data to recognizer engine 54. In another embodiment, recognizer engine 54 receives the tracking information directly from depth image processing and skeletal tracking module 50 and receives the audio data and visual image data directly from capture device 20.

Recognizer engine 54 is associated with a collection of filters 60, 62, 64, . . . , 66 each comprising information concerning a gesture, action or condition that may be performed by any person or object detectable by capture device 20. For example, the data from capture device 20 may be processed by filters 60, 62, 64, . . . , 66 to identify when a user or group of users has performed one or more gestures or other actions. Those gestures may be associated with various controls, objects or conditions of application 52. Thus, the computing environment 12 may use the recognizer engine 54, with the filters, to interpret movements.

Computing system 12 also includes gender recognizer software 70, which receives visual image data, depth image data and audio data from capture device 20. In response to, and based on, the received data, gender recognizer 70 automatically determines the gender of a person standing in front of (or near) capture device 20 and reports that determination of gender to application 52. In response, application 52 will interact with the person/user in front of (or near) capture device 20 in a manner tailored for the determined gender.

Capture device 20 of FIG. 2 provides RGB images (or visual images in other formats or color spaces) and depth images to computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device.

Figure 3:
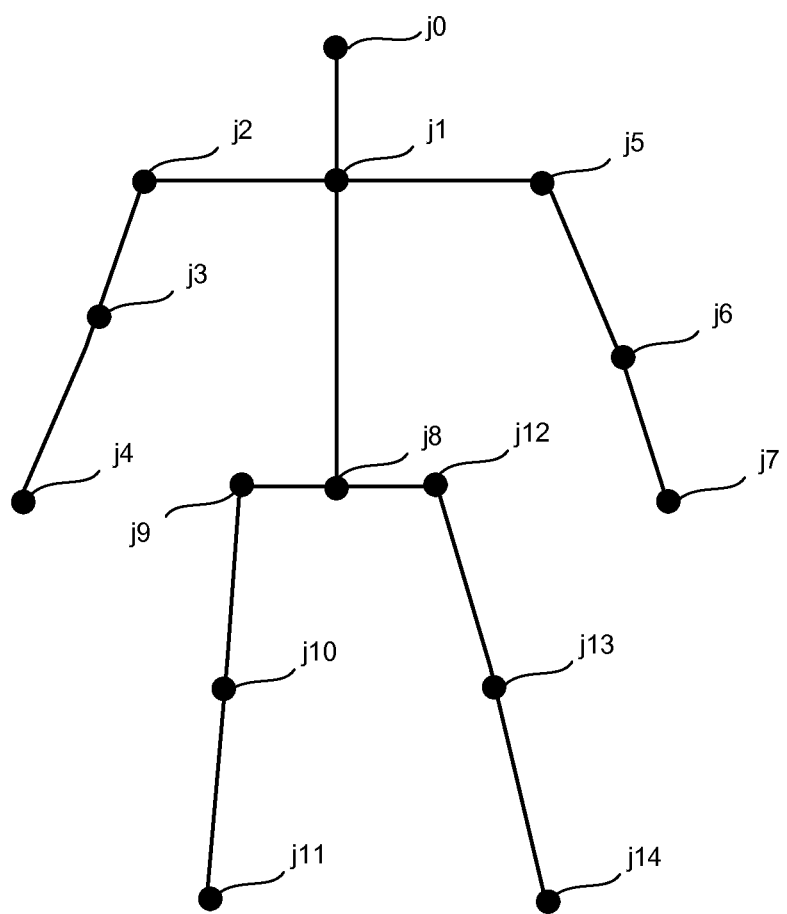
FIG. 3 depicts an example of a skeleton.

The system will use the RGB images and depth images to track a user's movements. For example, the system will track a skeleton of a person using the depth images. There are many methods that can be used to track the skeleton of a person using depth images. One suitable example of tracking a skeleton using depth image is provided in U.S. patent application Ser. No. 12/603,437, "Pose Tracking Pipeline" filed on Oct. 21, 2009, Craig, et al. (hereinafter referred to as the '437 Application), incorporated herein by reference in its entirety. The process of the '437 Application includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. FIG. 3 shows an example skeleton with 15 joints (j0, j1, j2, j3, j4, j5, j6, j7, j8, j9, j10, j11, j12, j13, and j14). Each of the joints represents a place in the skeleton where the skeleton can pivot in the x, y, z directions or a place of interest on the body. Other methods for tracking can also be used. Suitable tracking technology is also disclosed in the following four U.S. Patent Applications, all of which are incorporated herein by reference in their entirety: U.S. patent application Ser. No. 12/475,308, "Device for Identifying and Tracking Multiple Humans Over Time," filed on May 29, 2009; U.S. patent application Ser. No. 12/696,282, "Visual Based Identity Tracking," filed on Jan. 29, 2010; U.S. patent application Ser. No. 12/641,788, "Motion Detection Using Depth Images," filed on Dec. 18, 2009; and U.S. patent application Ser. No. 12/575,388, "Human Tracking System," filed on Oct. 7, 2009.

Recognizer engine 54 (of computing system 12 depicted in FIG. 2) includes multiple filters 60, 62, 64, . . . , 66 to determine a gesture or action. A filter comprises information defining a gesture, action or condition along with parameters, or metadata, for that gesture, action or condition. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand must travel (either absolute, or relative to the size of the user as a whole), and a confidence rating by the recognizer engine that the gesture occurred. These parameters for the gesture may vary between applications, between contexts of a single application, or within one context of one application over time.

Filters may be modular or interchangeable. In one embodiment, a filter has a number of inputs (each of those inputs having a type) and a number of outputs (each of those outputs having a type). A first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

The recognizer engine 54 may have a base recognizer engine that provides functionality to the filters. In one embodiment, the functionality that the recognizer engine 54 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 60, 62, 64, . . . , 66 are loaded and implemented on top of the recognizer engine 54 and can utilize services provided by recognizer engine 54 to all filters 60, 62, 64, . . . , 66. In one embodiment, recognizer engine 54 receives data to determine whether it meets the requirements of any filter 60, 62, 64, . . . , 66. Since these provided services, such as parsing the input, are provided once by recognizer engine 54 rather than by each filter 60, 62, 64, . . . , 66, such a service need only be processed once in a period of time as opposed to once per filter for that period, so the processing required to determine gestures is reduced.

Application 52 may use the filters 60, 62, 64, . . . , 66 provided with the recognizer engine 54, or it may provide its own filter, which plugs in to recognizer engine 54. In one embodiment, all filters have a common interface to enable this plug-in characteristic. Further, all filters may utilize parameters, so a single gesture tool below may be used to debug and tune the entire filter system.

More information about recognizer engine 54 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009. both of which are incorporated herein by reference in their entirety.

Figure 4:
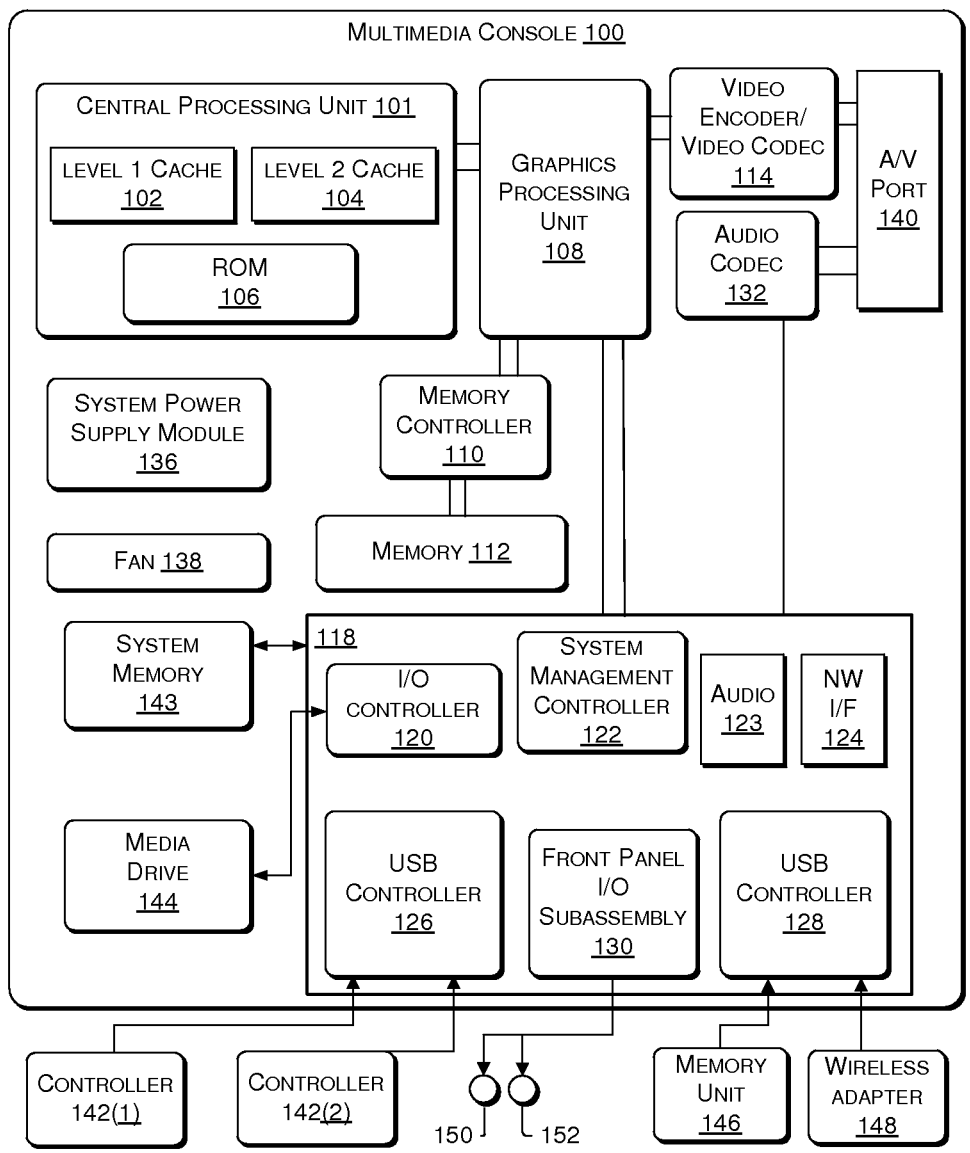
FIG. 4 illustrates an example embodiment of a computing system.

FIG. 4 illustrates an example embodiment of a computing system that may be used to implement computing system 12 shown in FIGS. 1A-2 used to track motion and/or animate (or otherwise update) an avatar or other on-screen object displayed by an application. The computing system such as the computing system 12 described above with respect to FIGS. 1A-2 may be a multimedia console 100, such as a gaming console. As shown in FIG. 4, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, Blu-Ray drive, hard disk drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio user or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100 via USB controller 126 or other interface.

Figure 5:
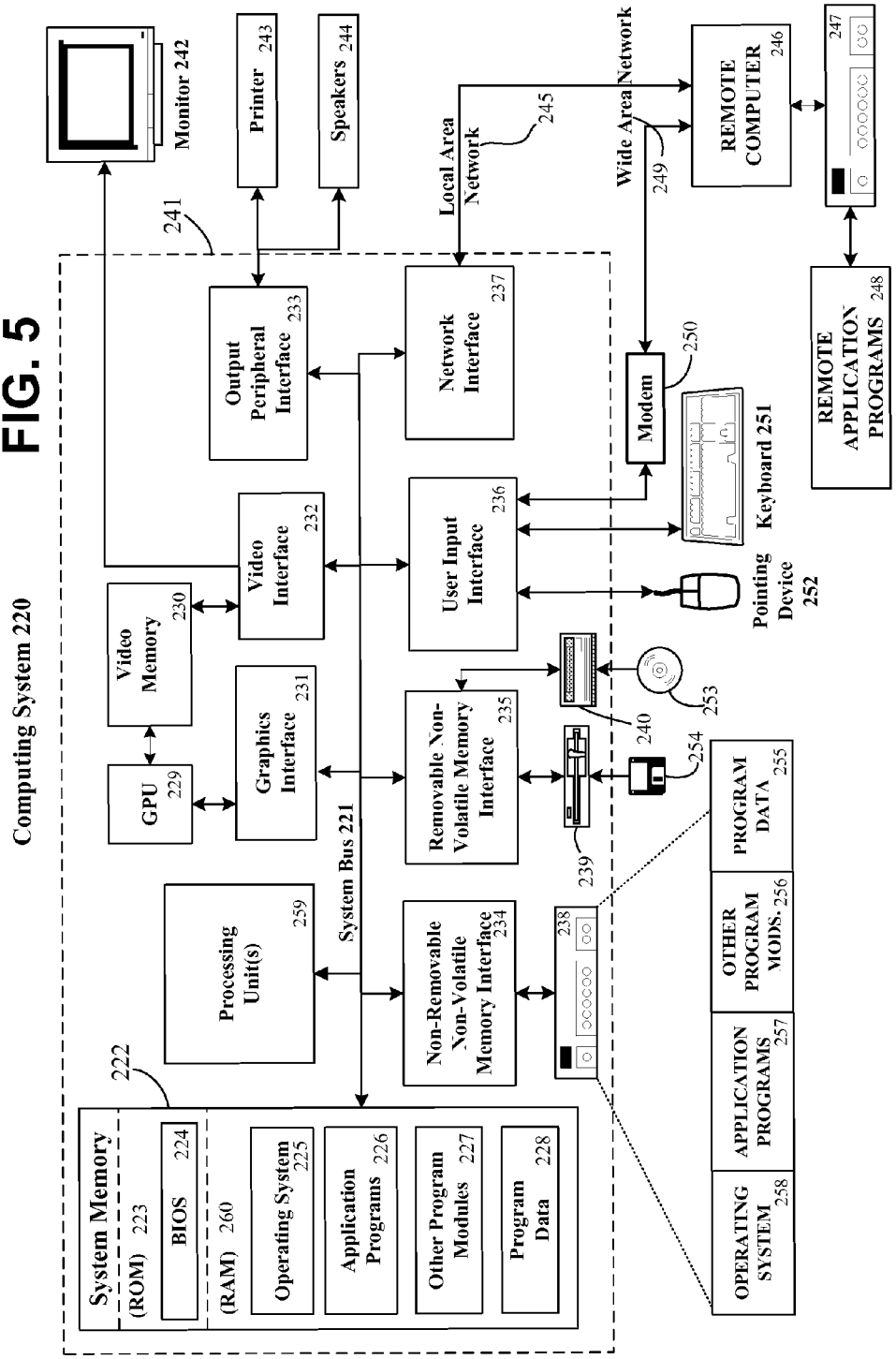
FIG. 5 illustrates another example embodiment of a computing system.

FIG. 5 illustrates another example embodiment of a computing system 220 that may be used to implement the computing system 12 shown in FIGS. 1A-2 used to track motion and/or animate (or otherwise update) an avatar or other on-screen object displayed by an application. The computing system environment 220 is only one example of a suitable computing system and is not intended to suggest any limitation as to the scope of use or functionality of the presently disclosed subject matter. Neither should the computing system 220 be interpreted as having any dependency or requirement relating to any one or combination of components illustrated in the exemplary operating system 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235. GPU 229 is connected to system bus 221 by graphics interface 231. Video Memory 230 (which is connected to GPU 229) is connected to system bus 221 by video interface 232.

The drives and their associated computer storage media discussed above and illustrated in FIG. 5, provide storage of computer readable instructions, data structures, program modules and other data for the computer 241. In FIG. 5, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100 that connect via user input interface 236. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233. Capture Device 20 may connect to computing system 220 via output peripheral interface 233, network interface 237, or other interface.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 5. The logical connections depicted include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 5 illustrates application programs 248 as residing on memory device 247. It will be appreciated that the network connections shown are exemplary and other means of establishing a communications link between the computers may be used.

Either of the systems of FIG. 4 or 5, or a different computing system, can be used to implement Computing System 12 of FIG. 2. As explained above, computing system 12 determines the motions of the users and employs those detected motions to control a video game or other application. For example, a user's motions can be used to control an avatar and/or object in a video game. Based knowledge of the user's gender, the computing system can adjust the user experience.

Figure 6:
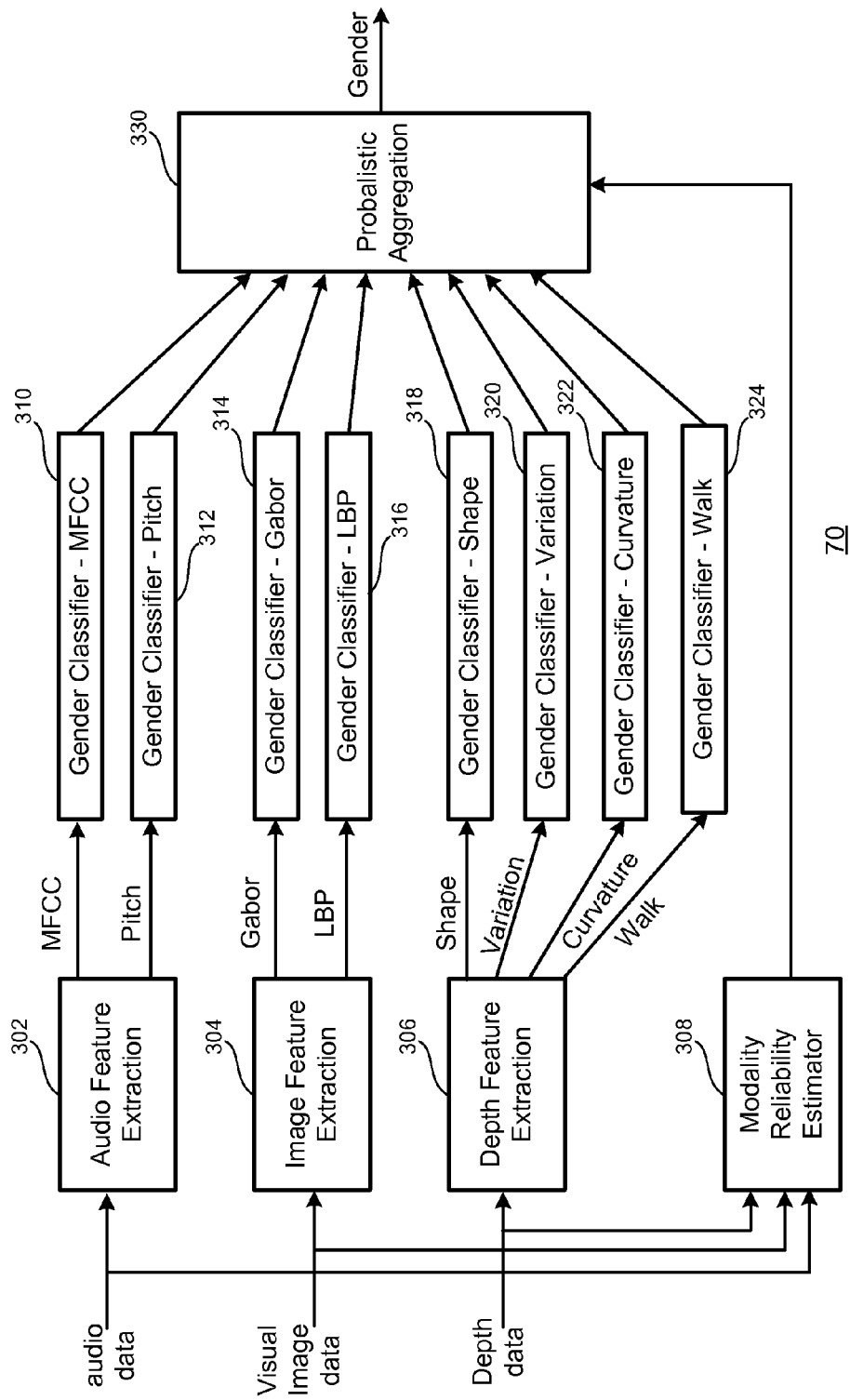
FIG. 6 is a block diagram of the software components used to determine gender.

FIG. 6 is a block diagram depicting details of gender recognizer software 70 (see FIG. 2). FIG. 6 depicts Audio Feature Extraction module 302, Image Feature Extraction module 304, Depth Feature Extraction module 306 and Modality Reliability Estimator 308, all of which will receive the input data from the sensors. For example, audio data is provided to Audio Feature Extraction module 302 and Modality Reliability Estimator 308. Visual image data from the camera sensor is provided to Image Feature Extraction module 304 and Modality Reliability Estimator 308. Depth data from the depth camera is provided to Depth Feature Extraction module 306 and Modality Reliability Estimator 308.

Modality Reliability Estimator 308 will determine how reliable the input data is from the sensor and assign a reliability value which will be used as a weight, as discussed below. The reliability estimation can be based on the quality of the data. For example, the depth data may have noise in it. Depending on the amount of noise, the Modality Reliability Estimator 308 will assign a reliability value to be used as a weight. The visual image could include noise. Additionally, Modality Reliability Estimator 308 can judge reliability of a visual image based on lighting, exposure, focus or framing of a subject in the image. Modality Reliability Estimator 308 can judge reliability of audio data based on noise in the audio signal as well as volume. Other factors can also be used to determine reliability.

Audio feature extraction module 302 receives the audio data from the microphone and identify various features in the audio signal. The particular audio data associated with the features extracted by Audio Feature Extraction 302 will be provided to one or more classifiers. FIG. 6 shows two example classifiers: Gender Classifier-MFCC 310 and Gender Classifier-pitch 312. In sound processing, the mel-frequency cepstrum is a representation of a short-term power spectrum of sound, based on a linear cosine transform of a log power spectrum on a nonlinear mel scale of frequency. Mel-frequency cepstral coefficients (MFCCs) are coefficients that collectively make up a mel-frequency cepstrum. They derive from a type of cepstral representation of an audio clip. Mel-frequency cepstral coefficients are commonly derived by taking the Fourier transform of a windowed excerpt of a signal, mapping the powers of the spectrum obtained onto the mel-scale using triangular overlapping windows, taking the logs of the powers of each of the mel-frequencies, and taking the discreet cosine transform of the list of log powers (as if it were a signal). The mel-frequency cepstral coefficients are the amplitudes of the resulting spectrum. There can be variations on this process. For example, differences in the shape or spacing the windows used to map the scale can be varied. MFCCs are commonly used as features in speech recognition systems for recognizing people from their voices and recognizing the gender of the person speaking. The data for the MFCC can be extracted by Audio Feature Extraction module 302 and provided to Gender Classifier-MFCC 310. In response to that data, Gender Classifier MFCC 310 will classify whether the speaker is male or female.

Audio Feature Extraction module 302 will also identify the pitch of the speaker. Alternatively, Audio Feature Extraction 302 can identify data that can be used to determine pitch. That information is provided to Gender Classifier-Pitch 312. In response to the data from Audio Feature Extraction 302, the Gender Classifier-Pitch 312 will classify whether the speaker is male or female. It is understood that females have a higher pitch than males.

Image Feature Extraction module 304 extracts various features from the image and provides the data for those features to Gender Classifier-Gabor 314 and Gender Classifier-LBP 316. Additional classifiers, or different classifiers, can also be used. A Gabor filter is a linear filter used in image processing for edge detection. Frequency and orientation representations of Gabor filters are similar to those of human visual systems and it can be found to be particularly appropriate for texture representation and discrimination. In the spatial domain, a two dimensional Gabor filter is a Gaussian kernel internal function modulated by a sinusoidal wave. The Gabor filters are self similar—all filters can be generated from one mother wavelet by dilation and rotation. The results of the Gabor filter are provided to Gender \Classifier-Gabor 314. In this case, the Gabor filter can be used to find shapes and Gender Classifier-Gabor 314 will make a classification of whether the subject is male or female based on the Gabor filter.

Local Binary Patterns (LBP) is a type of filter used for classification in computer vision and has been found to be particularly useful for classifying textures in an image. Based on running the local binary pattern filter, the resulting data will be provided to Gender Classifier-LBP 316 in order to make a classification of whether the subject is male or female. In one embodiment, the LBP data can be used to make a binary decision (yes/no) or a probabilistic decision (between 0 and 1) of whether the subject is a particular gender based on shapes or texture in the image.

Depth Feature Extraction module 306 extract various features from the depth image data and provides it to any one of a set of classifiers. For example, FIG. 6 shows four classifiers: Gender Classifier-Shape 318, Gender Classifier-Variation 320, Gender Classifier-Curvature 322 and Gender Classifier-Walk 324. Additional, or different Gender Classifiers can also be used. Depth Feature Extraction module 306 extract data that indicates shape of a portion of a person and provide that data to Gender Classifier-shape 318. For example, males and females have different shaped noses. Gender Classifier-Shape 318 can classify the subject as male or female based on the shape of the nose. Depth Feature Extraction module 306 can also provide data about variations the surface of the subject's body. For example, male faces tend to have more abrupt changes while female faces tend to have more gradual changes. Gender Classifier-Variation 320 makes a classification whether the subject is male or female based on the data above regarding variation in depth. Depth Feature Extraction module 306 identifies data about curvature of a surface of the subject and provide that data to Gender Classifier-Curvature 322. The curvature data can indicate a differential value of surface changes and how those surface changes fit a particularly shaped curve. With that information, a Gender Classifier-Curvature 322 can make a classification whether the subject is male or female. Depth Feature Extraction module 306 can identify information that indicates how a subject is walking, also known as gait. For example, using the technology described above for tracking Males and females walk differently. Based on the tracking of the subject walking, Gender Classifier-walk 324 can make a classification of whether the subject is male or female.

As discussed above, Gender Classifiers 310, 312, 314, 316, 318, 320, 322 and 324 will make initial classifications of whether the subject is male or female. In one embodiment, each classifier makes its own classification and sends that classification to Probabilistic Aggregation module 330. In one embodiment, the classification of whether the subject is male or female includes a binary decision. In another embodiment the classification of whether the subject is male or female includes calculating a probability of the subject being male and calculating a probability of the subject being female.

Modality Reliability Estimator 308 sends a reliability measure (e.g. a weight) for each type of data to Probabilistic Aggregation module 330. For example, a weight will be sent for audio data, another weight can be sent for visual image data and another weight can be sent for depth image data. In this example, classifiers 318, 320, 322 and 324 will share a first weight, classifiers 314 and 316 will share a second weight, and classifiers 310 and 312 will share a third weight. In another embodiment, Modality Reliability Estimator 308 will determine a different weight for each classifier.

Probabilistic Aggregation module 330 will make a final decision of the gender based on the various classifications and weights received. In one embodiment, probabilistic aggregation module 330 will multiply each of the probabilities reported by the classifiers 310-324 by the classifiers' associated weights to create a set of products (each product is a probability multiplied by a weight). Then, all the products for male will be added up and all the products for female will be added up. Probabilistic Aggregation module 330 will determine whether the sum for male is greater than the sum for female. If so, Probabilistic Aggregation module 330 will make a final determination that the subject is male. If the sum for female is greater than the sum for male, then Probabilistic Aggregation module 330 will make a final determination that subject is female.

Other embodiments for making a final determination of gender can also be used. For example, Probabilistic Aggregation module 330 can choose the classification of male or female associated with the highest weight. In another embodiment, other mathematical functions can be used to combine the various classifications (and their probabilities) and the weights. In another embodiment, each classifier can report a binary decision (e.g., male or female) and the gender with the most votes will be selected by probabilistic aggregation module 330.

Figure 7:
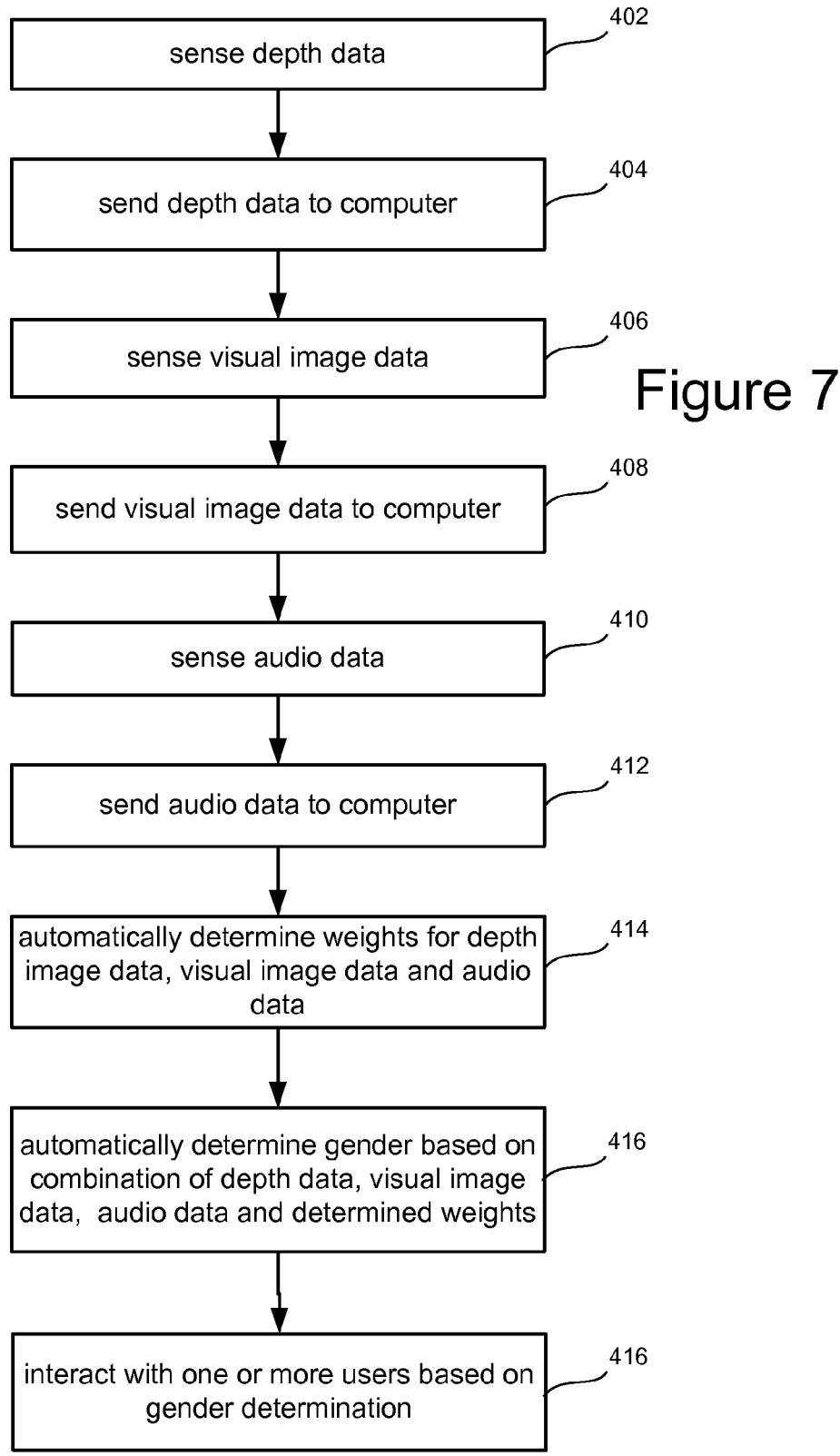
FIG. 7 is a flow chart describing one embodiment of a process for obtaining data, determining gender based on the data and using the determination of gender to interact with a user.

FIG. 7 is a flowchart describing one embodiment of a process that uses the depth image data, visual image data and audio data to determine gender and use that determination of gender to interact with one or more users. The process of FIG. 7 can make use of the software modules of FIG. 6 or other embodiments of software modules. In step 402 of FIG. 7, the system will sense depth image data. For example, capture device 20 of FIG. 2 will sense the depth image and that depth image data will be sent to the computing device in step 404. In step 406, the system will sense visual image data. For example, capture device 20 will sense a visual image and send that visual image to the computing device in step 408. The system can also sense and use infra-red and thermal images instead of or in addition to visual images. In step 410, the system will sense audio data. For example, microphone 30 of capture device 20 (FIG. 2) will sense audio data and that data will be sent to the computing device in step 412. In step 414, the system will automatically determine weights for the depth image data, visual image data and audio data. For example, Modality Reliability Estimator 308 will determine the various weights, as discussed above. In step 416, the system will automatically determine gender based on the combination of depth image data, visual image data and audio data, as well as the determined weights. In step 416, the computing system will interact with one or more users based on the determination of gender. For example, a user standing in front of capture device connected to a video game console will have the user's gender determined and then an avatar can be created based on the appropriate gender. The user can then interact with the video game based on that avatar. Various other interactions can be tailored based on gender.

Step 416 in FIG. 7 includes combining the depth image data, visual image data and audio data in order to determine gender. In general there are at least three levels of fusing information from the different sources: data/sensor level, feature level and decision level. The components of FIG. 6 depict a decision level fusion of information. For example, each of the types of information are sent to separate classifiers and decisions are made based on the individual types of information. The decisions of male/female made by the classifiers are then combined. In the data sensor level embodiment, the data from the different sources are fed into one decision making entity which will make one decision based on all the raw data from the sensors. In the feature level embodiment, various features are extracted from the raw data and those features are sent to one decision making entity which will make a single decision based on all the features. For example, FIG. 6 can be modified to provide a feature level fusion of information by removing the classifiers 310-324, and having the output of Audio Feature extraction module 302, Image Feature Extraction module 304 and Depth Feature Extraction module 306 be provided directly to Probabilistic Aggregation module 330.

In some embodiments, a hybrid model can be used. For example, features from the same type of data can be provided to a single classifier. For example, both the MFCC and pitch data output from audio features extraction 302 can be sent to a single classifier which will make a single initial classification. In such a hybrid embodiment, there will be one classification for audio data, one classification for visual image data and one classification for depth image data. The three classifications will then be provided to Probabilistic Aggregation module 330 for a final determination based on probability, probability and weights, or other factors.

Figure 8:
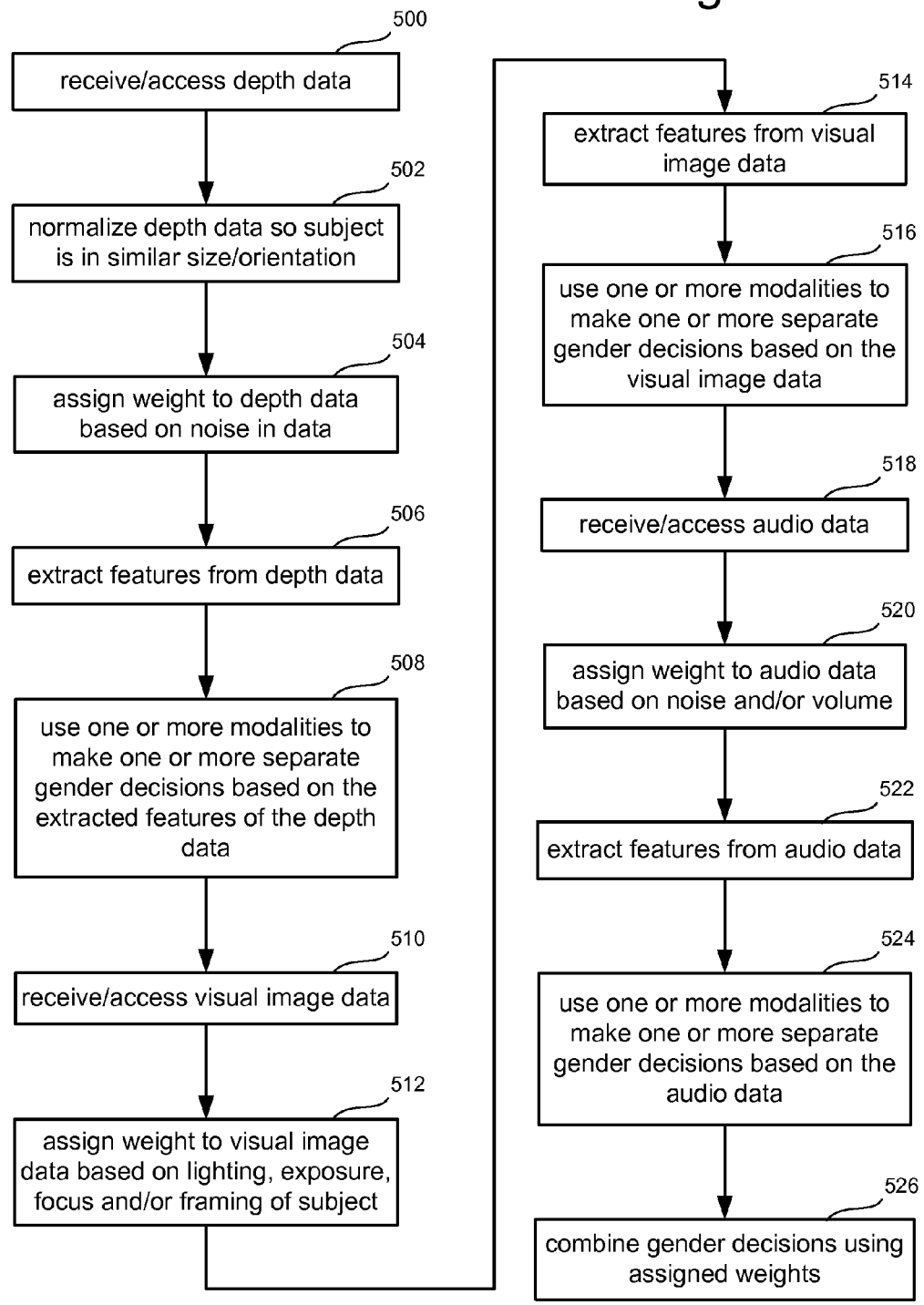
FIG. 8 is a flow chart describing one embodiment of a process for automatically determining gender.

FIG. 8 is a flowchart describing one embodiment of a process for automatically determining gender by using a feature level model implemented by the components of FIG. 6. The process of FIG. 8 is one example implementation of steps 414 and 416 of FIG. 7. In step 500 of FIG. 8, depth image data will be accessed. In step 502, the depth image data is normalized. That is, prior to classifying, the depth image data is preprocessed so that the system will access a depth image with the same view. For example, the orientation of the subject can be changed so that a common orientation is always used.

In step 504 of FIG. 8, Modality Reliability Estimator 308 will be used to assign a weight to the depth image data based on noise in the depth image data. In step 506, features of the depth image data will be extracted by Depth Feature Extraction module 306, as discussed above. In step 508, one or more modalities are used to make one or more separate gender decisions based on the extracted features of the depth image data. For example, FIG. 6 shows four Gender Classifiers 318, 320, 322 and 324 which represent the one or more modalities that make separate gender decisions based on the extracted features of the depth data.

In step 510, the visual image data is accessed. In step 512, Modality Reliability Estimator 308 will assign a weight to the visual image data based on lighting, exposure, focus and/or framing of the subject. In step 514, Image Feature Extraction module 304 will extract the appropriate features from the visual image data, as discussed above. In step 516, one or more modalities are used to make one or more separate gender decisions based on the visual image data. For example, FIG. 6 shows classifiers 314 and 316 which are examples of modalities that make one or more separate gender decisions.

In step 518, audio data is accessed. In step 520, Modality Reliability Estimator 308 will assign one or more weights to the audio data based on noise in the data and/or volume of the audio signal. In step 522, various features of the audio data will be extracted by Audio Feature Extraction module 302. In step 524, one or more modalities are used to make one or more separate gender decisions based on the audio data. For example, FIG. 6 shows classifiers 310 and 312 which are examples of modalities that make one or more separate decisions as to the gender of the subject. In step 526. separate gender decisions made in steps 508, 516 and 524 are combined based on the assigned weights to create a composite and final decision as to gender of the subject. For example, the final decision is made in step 526 by Probabilistic Aggregation module 330.

Figure 9:
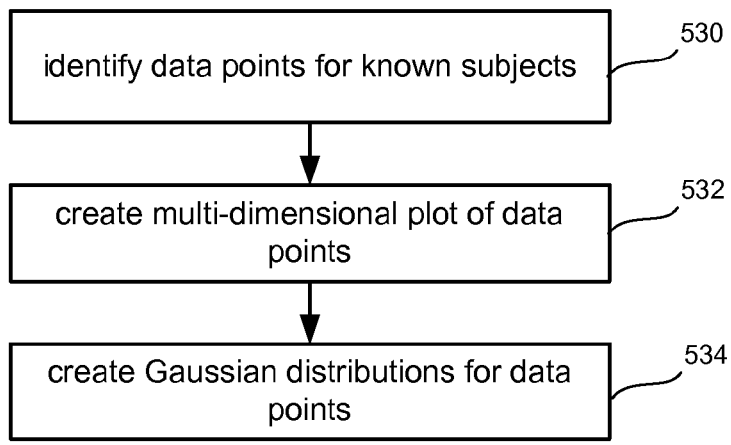
FIG. 9 is a flow chart describing one embodiment of a process for training.
Figure 10:
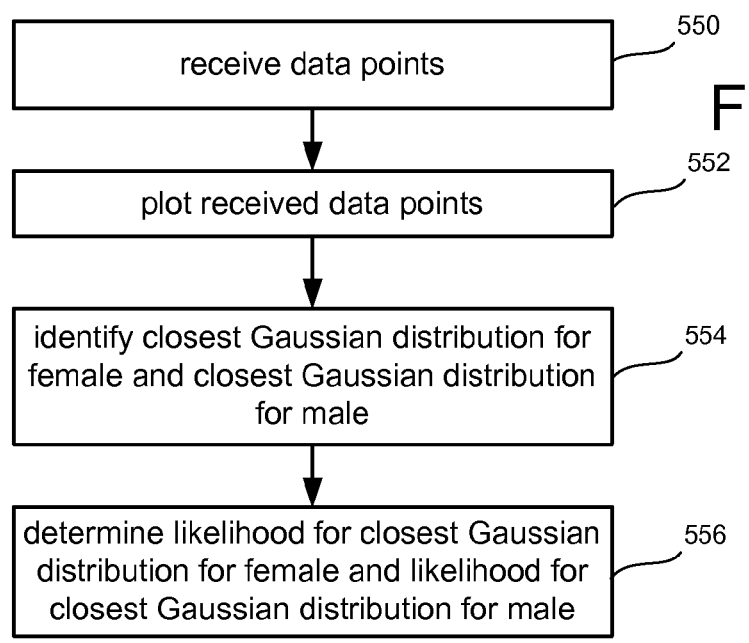
FIG. 10 is a flow chart describing one embodiment of a process for classifying gender.

There are many different methods for making a classification of gender based on the various data discussed above. The technology described herein is not limited to any one method for making the initial classification. In one example, data from the sensors can be aggregated and fitted into Gaussian distributions. Each Gaussian distribution of data will be associated with either female or male. When new data is received, the system will try to fit the data into Gaussian distribution with the best fit. The Gaussian distribution with the best fit will either be associated with male or female, and the system can classify the subject as either male or female based on that Gaussian distribution. Alternatively, the system will find the best female distribution that fits the data and the best male distribution that fits the data and create probabilities for the data being in both distributions. FIGS. 9 and 10 provide example of using such Gaussian distributions.

The process of FIG. 9 is performed prior to standard operation of the computing system that can determine and use gender. For example, the process of FIG. 9 can be part of a training process to provide the data for future gender determinations. In step 530 of FIG. 9, the system will identify data points for known subjects. For example, video game console could ask the users to have females stand in front of the capture device 20 and data can be obtained for visual images, depth images and voice. The same can be repeated for males. Step 530 can be performed for many females and many males. In step 532, the system will create multi-dimensional plots of data points from step 530. In step 534, the system will create multiple Gaussian distributions for the data points. Each Gaussian distribution will be only male data points or only female data points. There can be multiple Gaussian distributions for male data points and multiple Gaussian distributions for female data points.

The process of FIG. 10 is one example of classifying the gender of a subject using the trained data from FIG. 9. For example, the process of FIG. 10 can be used as part of steps 508, 516 and 524 of FIG. 8 to make initial classification of whether a subject is male or female. In step 550 of FIG. 10, the system will receive various data points from any of the sensors discussed above. In step 552, the data points will be plotted in the multi-dimensional plot discussed above. Note that it is not necessary to actually draw a multi-dimensional graph. Rather, the data can be plotted symbolically using a data structure or equivalent means. In step 554, the system will identify the closest Gaussian distribution for female data and the closest Gaussian distribution for male data. In step 556, the system will determine the likelihood that the data is in the closest Gaussian distribution for female data and the likelihood that the data is in the closest Gaussian distribution for male data. These probabilities will be output by the appropriate classifier (e.g. classifiers 310-324). Probabilistic Aggregation module 330 will use the probabilities (multiplied by or otherwise combined by the weights from Modality Reliability Estimator 308) to determine a final decision as to gender of the subject.

Figure 11:
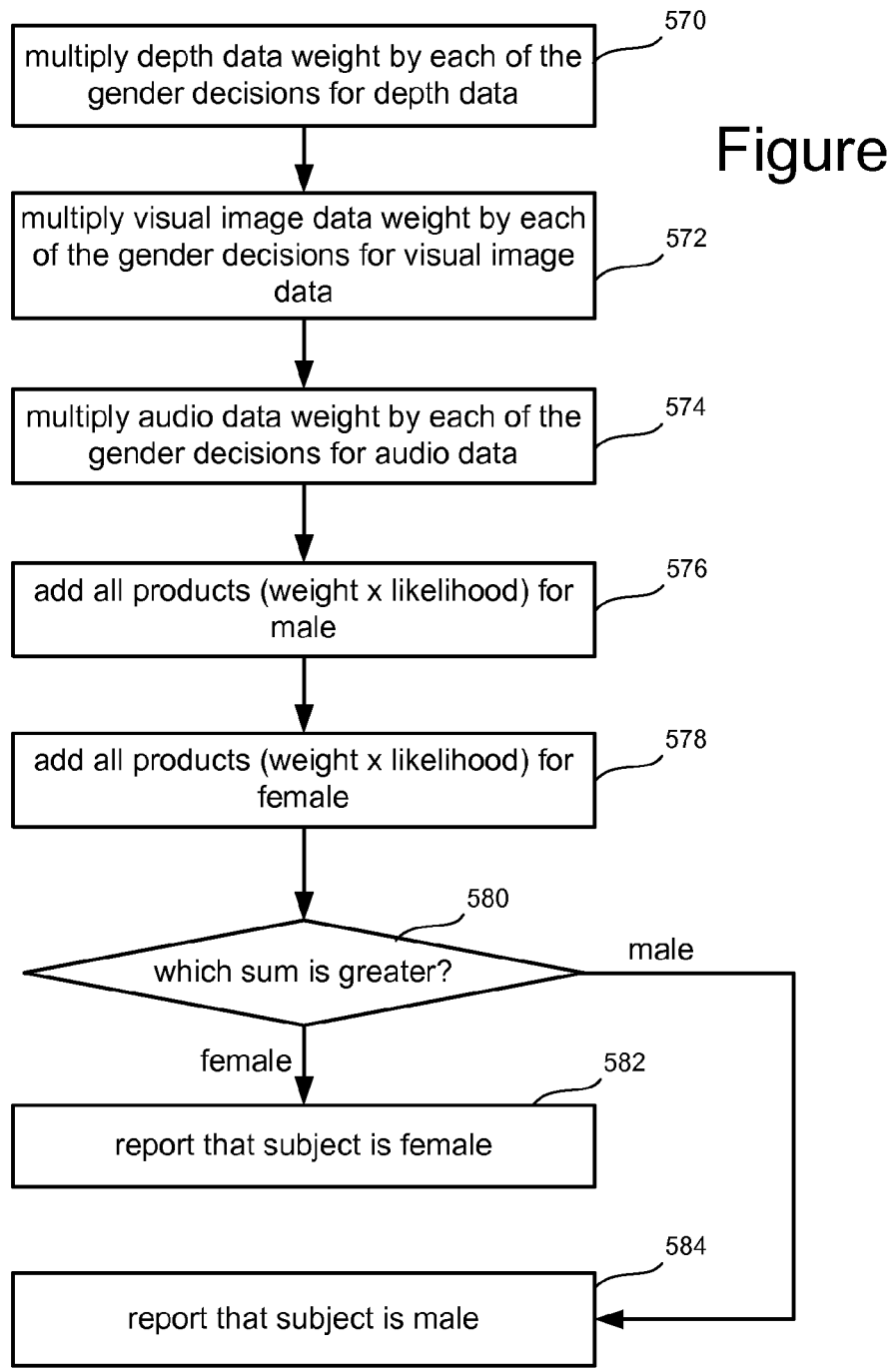
FIG. 11 is a flow chart describing one embodiment of a process for fusing decision data to determine gender.

FIG. 11 is a flowchart describing one embodiment for combining the gender decisions using the assigned weights. That is, the process of FIG. 11 is one example implementation of step 526 of FIG. 8. In step 570, the depth data weight assigned by Modality Reliability Estimator 308 is multiplied by each of the gender decisions of the classifiers that make initial classifications based on depth data (e.g. classifiers 318-324). For example, each of the classifiers will output a probability that the subject is male and the probability that the subject is female, and step 530 will include multiplying the weight by each of those probabilities. In step 572, Probabilistic Aggregation module 330 will multiply the visual image weight assigned by Modality Reliability Estimator 308 by each of the gender decisions by the classifiers that make classifications based on image features. For example, the image weight determined by Modality Reliability Estimator 308 will be multiplied by the male probability and female probability output by classifiers 314 and 316. In step 574, Probabilistic Aggregation module 330 will multiply the audio data weight by each of the gender decisions for the audio data. For example, the weight for audio data output by Modality Reliability Estimator 308 will be multiplied by the probability of the subject being male and the probability of the subject being female as calculated by classifiers 310 and 312. All the products (weight times likelihood of being male) are added to create a sum of probability of the subject being male in step 576. All the products (weight times likelihood of the subject being female) are added to create a sum of the probability of the subject being female in step 578. In step 580, it is determined which sum is greater. If the female sum is greater, then in step 582, Probabilistic Aggregation module 330 reports that the subject is female. If the male sum is greater, then in step 584, Probabilistic Aggregation module 330 will report that the subject is male in step 584. Note that steps 582 and 584 included reporting the gender to application 52 (see FIG. 2), which will use that information to tailor the interaction with the user.

Figure 12:
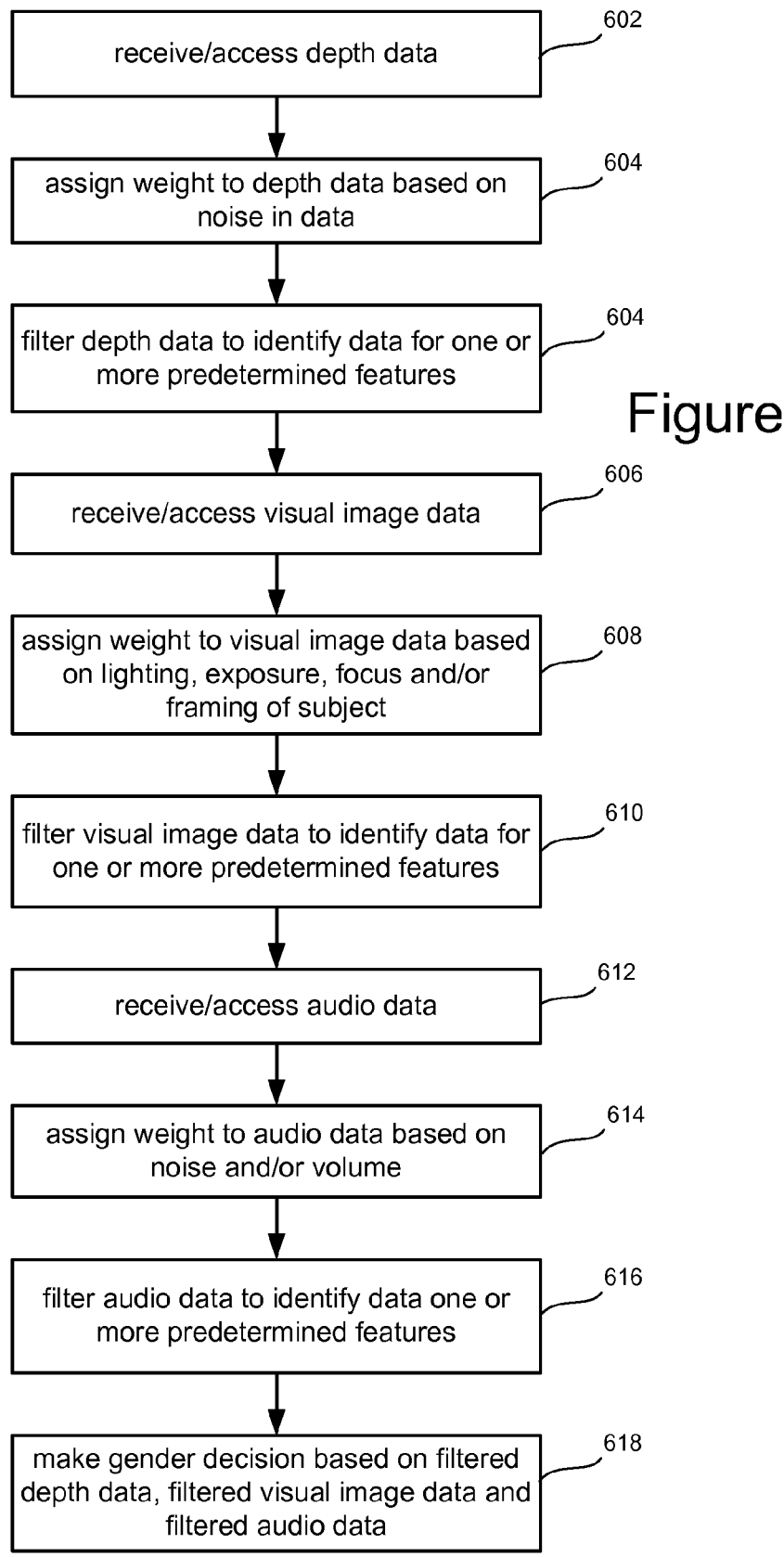
FIG. 12 is a flow chart describing one embodiment of a process for fusing feature data to determine gender.

FIG. 12 is a flowchart describing one embodiment of the processes for automatically determining gender based on combining the data at the feature level. That is, the process of FIG. 12 is one example implementation of steps 414 or 416 of FIG. 7. The process of FIG. 12 is an alternative embodiment as compared to process of FIG. 11. In step 602 of FIG. 12, the system will receive or access depth data. In step 604, a weight will be assigned to the depth data based on noise in the data. In step 604, the depth data will be filtered to identify data for one or more predetermined features. Step 604 includes identifying such features as curvature, shape, style of walking, etc. In step 606, the system will receive or access visual image data. In step 608, one or more weights will be assigned to the visual image data based on lighting, exposure, focus and/or framing of the subject. In step 610, the visual image will be filtered to identify data for one or more predetermined features. For example, the system will find data for the corner of the mouth, corner of the eyes, shape of the nose, Adam's apple, etc. In step 612, the system will receive or access audio data. In step 614, one or more weights will be assigned to the audio data based on noise or volume. In step 616, the audio data will be filtered to identify one or more predetermined features, such as pitch, tone, indentation, etc. In step 618, a decision of gender will be made based on the filtered depth data, filtered visual data, and filtered audio data.

Figure 13:
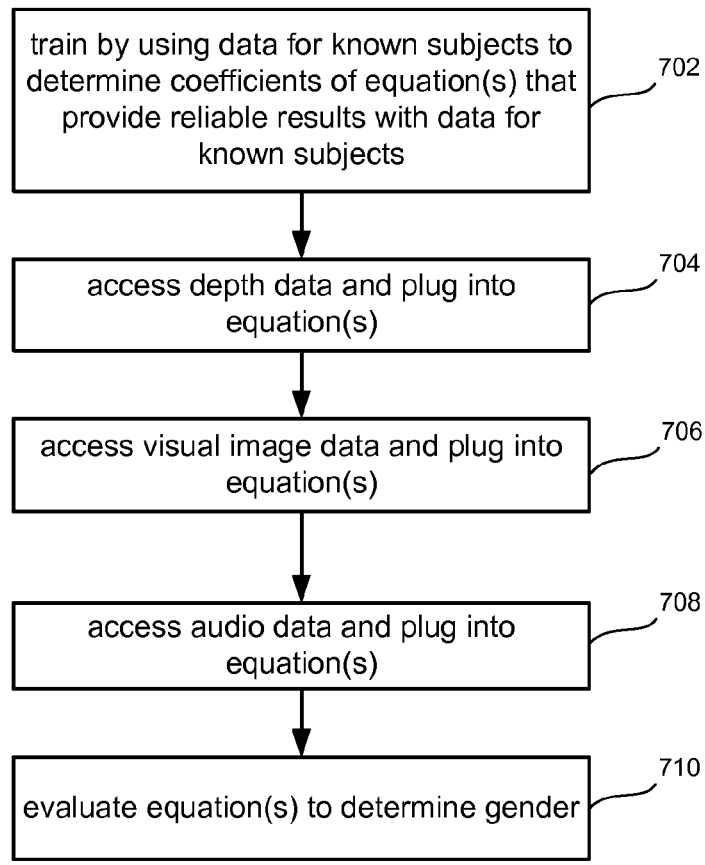
FIG. 13 is a flow chart describing one embodiment of a process for fusing sensor data to determine gender.
Figure 13A:
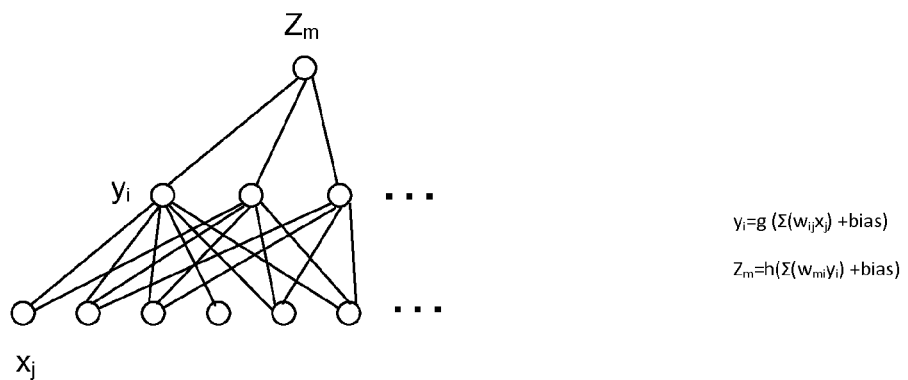
FIG. 13A depict a graph used to model the fusion of sensor data to determine gender.

FIG. 13 is a flowchart describing one embodiment of a process for combining different types of data to determine gender, where the data is combined at that data/sensor level. That is, the process of FIG. 13 is an alternative embodiment for implementing steps 414 and 416 of FIG. 7. In step 702, the system will be trained by using data for known subjects to determine coefficients of equations that provide reliable results with data for the known subjects. For example, FIG. 13a shows a graph. The bottom level of nodes includes data from the sensors $x_{ij}$. FIG. 13a only shows a subset of the various data values $x_j$, and more data values would be included in the production version graph. The graph of FIG. 13a also shows intermediate decisions $y_i$. FIG. 13a shows the generic formula for determining the values at $y_i$ which is a function g that includes multiplying coefficient $w_{ij}$ by all or a subset of data sensor values $x_j$ and adding up those coefficients, plus a bias. In one embodiment, there are two upper level nodes $Z_m$ and $Z_f$. The node $Z_m$ is the final node indicating a decision probability for the subject being male and $Z_f$ provides a decision probability for the subject being female. FIG. 13A shows the formula for determining the probability of the subject being male as a function h of the sum of coefficients $w_{mi}$ multiplied by one or more of the functions $y_i$ plus a bias. The purpose of step 702 is to use data for a subject of known gender in order to calculate coefficients $w_{mi}$, $w_{fi}$ and $w_{ij}$ that provide reliable results. Step 702 is performed in advance of operation of the system, or during a special training session. Step 704-72 are performed during production operation (e.g. while playing a video game, providing a service or using an application).

In step 704 of FIG. 13, the system will access the depth data and plug it into the appropriate equations. In step 706, the system will access visual data and plug it into the appropriate equations. In step 708, the system will access audio data and plug it into the appropriate equations. In step 710, the various equations are evaluated to determine the probability of the subject being male and the probability of the subject being female. If if the probability of being male is higher than the probability of being female, then the final decision will be that the subject is male. If the probability of the subject being female is greater than the probability of the subject being male, then the final decision will be that the subject is female.

Figure 14A:
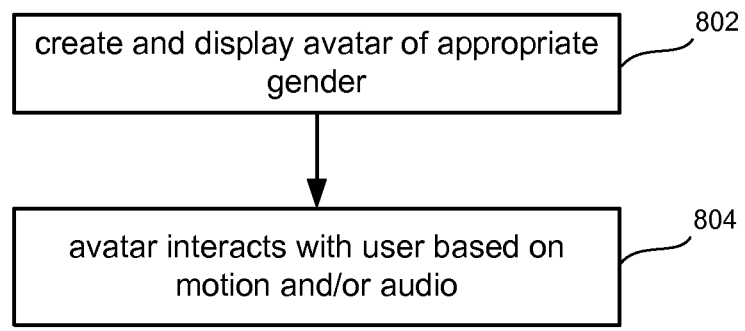
FIG. 14A is a flow chart describing one embodiment of a process for interacting with a user based on the determination of gender.
Figure 14B:
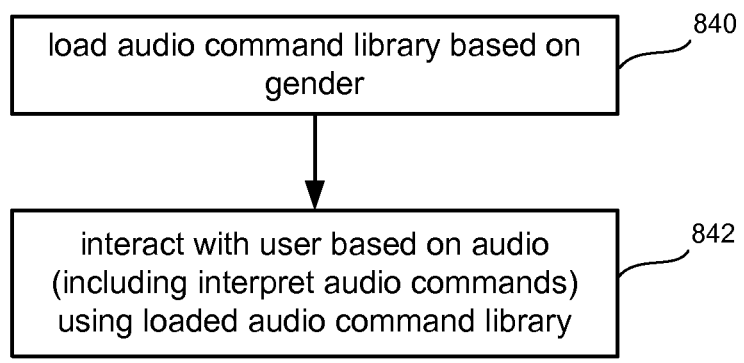
FIG. 14B is a flow chart describing one embodiment of a process for interacting with a user based on the determination of gender.

Looking back at FIG. 7, step 416 includes interacting with one or more users based on the determination of gender made in FIG. 7. FIGS. 14A and 14B provide examples if interacting with the user based on that gender determination.

FIG. 14A is a flowchart describing interaction with a user by creating an avatar of the appropriate gender. In step 802, the system will create and display an avatar of the appropriate gender matching the gender determined for the subject user. In step 804, that avatar will interact with the user based on motion and/or audio. For example, the users motions will be tracked and the avatar will mimic those motions or respond to those motions. Additionally, the user can say voice commands to control the avatar. In one embodiment, when the user speaks, the avatar can speak the same words in the same or different language.

FIG. 14B is a flowchart describing interaction with a user based on the gender determination in order to improve recognition of voice commands. In one embodiment, the system will include one library for identifying voice commands from males and another library for identifying voice commands from females. In step 840 of FIG. 14B, the system will load the appropriate audio command library based on the determined gender. For example, if the system determined that the gender of the subject is female, then the female voice command library will be loaded in step 840. In step 842, the system will interact with the user based on audio commands (including recognizing the audio commands) using the loaded audio command library so that the user can instruct the system to perform various functions using audio commands.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method for a data processing system to interact with a user, comprising:

receiving depth data about a person;

receiving one or more types of data other than depth data about the person;

automatically determining gender of the person based on the depth data and the one or more types of data other than depth data;

assigning weights to the depth data and the one or more other types of data based on quality of the data, the automatically determining gender is further based on the assigned weights; and performing an action based on the determination of gender.

2. The method of claim 1, wherein:

the receiving one or more types of data other than depth data comprises receiving audio data for the person's voice.

3. The method of claim 1, wherein:

the receiving one or more types of data other than depth data comprises receiving a visual image, infra-red image or thermal image of the person.

4. The method of claim 1, wherein the automatically determining gender comprises:

extracting a first set of one or more features from the depth data and making a first determination of gender based on the first set of one or more features;

extracting a second set of one or more features from the depth data and making a second determination of gender based on the second set of one or more features;

extracting a third set of one or more features from a different type of data and making a third determination of gender based on the third set of one or more features, the different type of data is one of the one or more types of data other than depth data;

extracting a fourth set of one or more features from the different type of data and making a fourth determination of gender based on the fourth set of one or more features; and forming a conclusion of gender based on the first determination of gender, the second determination of gender, the third determination of gender and the fourth determination of gender.

5. The method of claim 4, further comprising:
identifying a first weight to the depth data and a second weight to the different type of data;
assigning the first weight to the first determination of gender;
assigning the first weight to the second determination of gender;
assigning the second weight to the third determination of gender; and
assigning the second weight to the fourth determination of gender, the forming a conclusion includes using the determinations of gender and assigned weights.

6. The method of claim 5, further comprising:
normalizing the depth data by transforming a depth image, the transforming the depth image changes the orientation of the person in the depth image.

7. The method of claim 6, wherein:
the making a first determination of gender includes assigning the first set of one or more features to a specific Gaussian distribution of a plurality of Gaussian distributions based on likelihood of belonging to the specific Gaussian distribution;
the assigning the first weight to the first determination of gender includes multiplying the first weight by the likelihood of belonging to the specific Gaussian distribution to create a product for the first determination of gender; and
the combining the determinations of gender and assigned weights includes adding the product for the first determination of gender to products for the second, third and fourth determinations of gender to create a composite score and determining gender of the person based on the composite score.

8. The method of claim 1, wherein the automatically determining gender comprises:
filtering the depth data to identify data for a first feature;
filtering the one or more types of data to identify data for other features; and
identifying gender of the person based on the data for the first feature and the data for the other features.

9. The method of claim 1, wherein the automatically determining gender comprises:
plugging in the depth data and the one or more types of data other than depth data into a set of one or more equations that make one decision of gender.

10. The method of claim 1, wherein the performing an action based on the determination of gender comprises:
creating and displaying an avatar having a gender matching the determined gender of the person.

11. The method of claim 1, wherein the performing an action based on the determination of gender comprises:
choosing a specific voice command library from a plurality of voice command libraries based on the determination of gender;
receiving a voice command; and
interpreting the received voice command using the specific voice command library.

12. One or more processor readable storage devices having processor readable code stored thereon, the processor readable code programs the one or more processors, the processor readable code comprising:
code that extracts depth features;
code that extracts one or more other features;
code, in communication with the code that extracts depth features, that classifies gender based on at least one depth feature;
code, in communication with the code that extracts one or more other features, that classifies gender based on at least one feature other than depth;
code which makes a gender determination based on output from the code that classifies gender based on at least one depth feature and the code that classifies gender based on at least one feature other than depth; and
code that estimates reliability of depth data, visual image data and voice data and determines weights for the depth data, visual image data and voice data based on the estimated reliability; the code which makes the gender determination based on output from the code that classifies gender based on at least one depth feature and the code that classifies gender based on at least one feature other than depth makes its gender determination based on the weights for the depth data, visual image data and voice data.

13. The one or more processor readable storage devices of claim 12, wherein:
the code that extracts one or more other features comprises code that extracts visual image features and code that extracts voice features; and
the code that classifies gender based on at least one feature other than depth comprises code that that classifies gender based on at least one visual image feature and code that that classifies gender based on at least one visual image feature.

14. The one or more processor readable storage devices of claim 12, wherein:
the code that classifies gender based on at least one depth feature includes first code that makes a first gender classification based on shape of a subject in a depth image and second code that makes a separate second gender classification based on curvature of a surface of the subject in the depth image.

15. The one or more processor readable storage devices of claim 14, wherein:
the code that classifies gender based on at least one feature other than depth includes third code that makes a separate third gender classification based on pitch of the subject's voice and fourth code that makes a separate fourth gender classification based on an image of the subject; and
the code which makes the gender determination based on output from the code that classifies gender based on at least one depth feature and the code that classifies gender based on at least one feature other than depth makes a final gender decision based on the first gender classification, the second gender classification, the third gender classification and the fourth gender classification.

16. A computing apparatus, comprising:
a depth sensor, the depth sensor acquires depth data about a person;
a different sensor that is different from the depth sensor, the different sensor acquires one or more types of data other than depth data about the person;
and
a processor in communication with the depth sensor and the different sensor, the processor assigns weights to the depth data and the one or more other types of data based on quality of the data, the processor determines gender of the person based on the depth data and the one or more types of data other than depth data, the processor determines gender of the person based on the assigned weights, the processor performs an action based on the determination of gender.

17. The computer of claim 16, wherein:

the computing apparatus further comprises an image sensor in communication with the processor;

the different sensor is an audio sensor;

the processor determines gender of the person based on data from the depth sensor, the image sensor and the audio sensor.

18. The computer of claim 17, wherein:

the processor automatically tracks motion of the person whose gender is being determined using data from the depth sensor; and the processor performs the action based on the determination of gender in response to the tracking motion.

19. The computer of claim 16, wherein:

the performing an action based on the determination of gender comprises creating and displaying an avatar having a gender matching the determined gender of the person.

20. The computer of claim 16, wherein:

the one or more types of data other than depth data comprises audio data for the person's voice.

* * * * *